Dec. 20, 1932.     K. E. PEILER     1,891,604
HEAT INSULATED REFRACTORY FOR MOLTEN GLASS CONTAINERS
Filed Jan. 15, 1929

Witness:
A. A. Horn.

Inventor
Karl E. Peiler
by ⟨signature⟩
Attorney.

Patented Dec. 20, 1932

1,891,604

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

HEAT INSULATED REFRACTORY FOR MOLTEN GLASS CONTAINERS

Application filed January 15, 1929. Serial No. 332,651.

My invention relates to refractory bodies for contact with molten glass and for analogous purposes. Its general object is to provide a heat-insulated refractory block of improved construction, the insulation being contained within a cavity in the block, in such a way that, when the blocks are associated together in a glass-engaging wall, the wall will be heat-insulated over substantially its entire area, except in the areas adjacent to the seams of the blocks, these areas being exposed to the outer air so as to insure the freezing of the glass that may penetrate between the blocks.

It has long been recognized that tank furnaces and other structures for containing molten glass have had exceedingly low heat-efficiency, and the desirability of heat-insulating such containers for molten glass has been understood. Attempts to insulate such glass-containing structures have been successful only to a limited extent, because the glass would not freeze sufficiently at the seams or joints to keep it from running out. Moreover even if the refractory is of sufficiently high quality to withstand the severe heat conditions brought about by the insulation, it has been found that the glass penetrating between and around the refractory blocks attacks the blocks on several of its sides, in addition to the side normally in contact with the glass and may also attack the insulation. Therefore the effective life of heat-insulated refractory structures is considerably reduced.

According to my present invention, I provide refractory blocks for the purposes indicated above, having cavities of substantial size to receive heat-insulating material, these cavities being preferably open toward the sides of the blocks opposite their glass engaging faces. The insulation within these cavities may be in powdered form or in the form of solid bricks or blocks and, as stated above, effectively insulates the major portions of the blocks, leaving exposed the areas of the blocks adjacent to the seams between them, so that glass entering the seams will freeze before it reaches the outer sides of the blocks.

Figure 1:
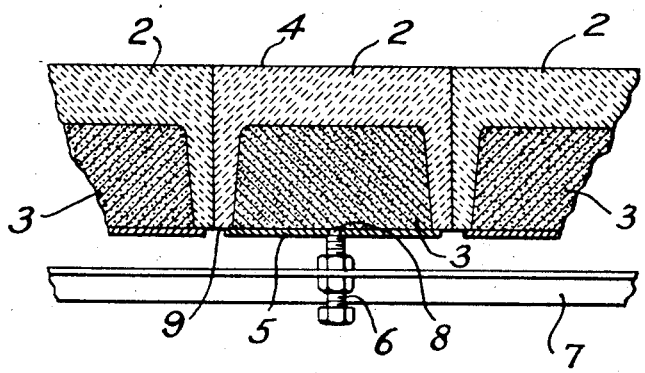
Figure 1 is a fragmentary cross-sectional view of a refractory wall composed of blocks constructed and arranged in accordance with my invention.
Figure 2:
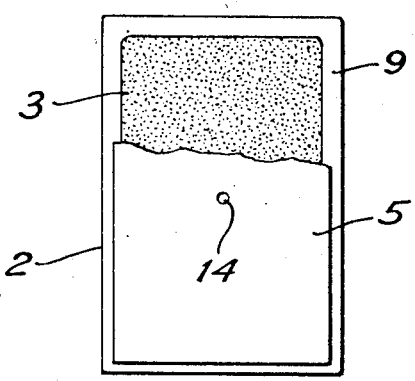
Fig. 2 is an elevational view of one of the blocks shown in Fig. 1, with a portion of the retaining plate broken away.

Figure 1 shows a portion of a refractory wall which may be a side or bottom wall of a glass tank furnace or a wall of a glass feeder forehearth. This wall is composed of blocks 2, each having a cavity 3 which is open toward the side of the block opposite its glass-engaging surface 4. The cavity 3 is filled with heat-insulation which, in the form of Figs. 1 and 2, is powdered insulating material, such as kieselguhr. This material may be held in place by means of a retaining plate 5, and each of the plates 5 may be held in place by means of a screw 6 carried by a brace 7 and having a reduced end 8 engaging an opening 14 in the plate 5.

Various methods may be employed for filling the cavities in the blocks with powdered insulating material. For example, the blocks may be laid flat on their faces 4 and the box-like cavities filled with the powdered insulating material, after which sheets of stout paper may be pasted over the cavities in the blocks to serve as temporary supports for the insulating material while the blocks are being set in place, and the plates 5 may then be applied to form the permanent support for the insulation. Also, the cavities may be filled after the blocks are laid up in a vertical wall by placing the plates 5 over the cavities in such a way as to leave the top part of each cavity exposed, then filling in the insulation and finally sliding the plate upward into place.

It will be noted that the cavity in each block is formed, in effect, by an integral flange 9 extending around the body portion of the block, and it will also be seen that these flanges, engaging one another at the seams between the blocks, form exposed areas which remain cooler than the insulated portions of the blocks. Therefore, glass penetrating the seams between the blocks will freeze before reaching the outer surface of the wall, but at the same time the initial portions of the blocks are effectively heat insulated.

If desired, cooling air may be blown upon the seams between the blocks to insure still further that no molten glass will reach the outer surface of the wall.

Figure 3:
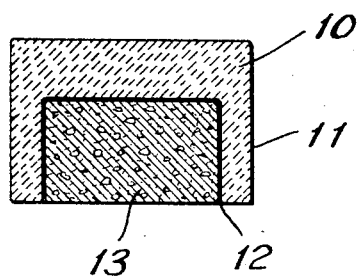
Fig. 3 is a sectional view of a modified form of block embodying my invention.

Fig. 3 shows a modified form of block having a body portion 10, an annular flange 11, forming a cavity 12 and a solid block 13 of heat insulating material which may be set in the cavity 12 either with or without luting or other means for holding the insulating block in place. The insulating insert 13 may consist of cork brick or any other suitable form of heat insulating material. Blocks constructed according to this invention may be used in building the side and bottom walls of glass melting tank furnaces, for building the sides and bottom walls of gathering pools and other glass feeding forehearths or receptacles. The expressions "solid insulating material" and "solid heat insulating material" as used in the claims are intended to apply to and cover both brick and loose or powdered forms of insulating material.

The specific constructions herein shown and described may be variously modified within the scope of the appended claims.

I claim as my invention:

1. A refractory block having a hollow interior open on one side only of the block, said interior being filled with solid insulating material.

2. A refractory block having a hollow interior open on one side of the block and heat insulating material confined entirely within the hollow of said block.

3. A block for contact with molten glass comprising a refractory wall portion for engagement with the glass, and a flange extending from all the edges of said glass-engaging wall portion and forming an enclosure open on the side opposite the side wall portion, and solid heat insulating material disposed within said enclosure.

4. A block for contact with molten glass comprising a refractory wall portion for engagement with the glass, and a flange extending from the edges of said glass-engaging wall portion and forming an enclosure open on the side opposite the side wall portion, heat insulating material disposed within said enclosure, and means separate from the block for retaining said heat insulating material in place.

5. A block for contact with molten glass comprising a refractory wall portion for engagement with the glass, and a flange extending from the edges of said glass-engaging wall portion and forming an enclosure open on the side opposite the side wall portion, powdered heat insulating material disposed within said enclosure, and a retaining plate for holding said heat insulating material in place.

6. A block for contact with molten glass comprising a refractory wall portion for engagement with the glass, and a flange extending from the edges of said glass-engaging wall portion and forming an enclosure open on the side opposite the side wall portion, powdered heat insulating material disposed within said enclosure, a retaining plate for holding said heat insulating material in place and means for supporting said retaining plate.

7. A refractory block having a cavity open toward one side of the block and an insert of heat insulating material contained within said cavity the outer face of said insert being even with the portion of the block surrounding said cavity.

8. A wall for contact with molten glass composed of a plurality of blocks each having a cavity open toward the side of the block opposite to its glass-engaging surface, and solid heat-insulating material contained within the cavities of said blocks.

9. A wall for contact with molten glass composed of a plurality of blocks each having a cavity open toward the side of the block opposite to its glass-engaging surface, powdered heat insulating material contained within the cavities of said blocks, retaining plates closing the said cavities and holding said insulating material in place, braces adjacent the outer side of said wall and screws extending through said braces and engaging said plates for holding said plates in position.

Signed at Hartford, Connecticut, this 11th day of January 1929.

KARL E. PEILER.